United States Patent [19]
Pohler et al.

[11] 3,722,462
[45] Mar. 27, 1973

[54] APPARATUS FOR COATING MATERIALS OF ALL KINDS WITH A PLASTIC COATING, IN PARTICULAR FOR IMPREGNATING WEBS OF INSULATING MATERIAL WITH ELECTRICALLY CONDUCTING PLASTIC DISPERSIONS

[75] Inventors: Alfred Pohler, Reutte; Erich Hayek, Vienna, both of Austria

[73] Assignees: Metallwerk Plansee Aktiengesellschaft & Co. KG, Tirol; E. Schrack Elektrizitats Aktiengesellschaft, Wien, both of Austria

[22] Filed: Jan. 13, 1971

[21] Appl. No.: 106,097

[30] Foreign Application Priority Data

Jan. 16, 1970 Austria..........................427

[52] U.S. Cl............................118/5, 118/63, 118/65, 118/423, 118/642, 219/501
[51] Int. Cl.............................................B05c 11/00

[58] Field of Search......................118/620, 641–643, 118/48–49.5, 5, 64, 65; 318/610; 117/1 NQ; 13/1 NQ; 219/498, 501

[56] References Cited

UNITED STATES PATENTS

| | | | |
|---|---|---|---|
| 3,377,547 | 4/1968 | Ohlson | 318/610 X |
| 3,584,208 | 6/1971 | Slawson et al. | 318/610 X |
| 3,686,557 | 8/1972 | Futamura | 318/610 X |
| 2,826,166 | 3/1958 | Davis, Jr. | 118/5 |
| 3,188,230 | 6/1965 | Bakish et al. | 118/48 X |
| 3,190,262 | 6/1965 | Bakish et al. | 118/48 |

Primary Examiner—Morris Kaplan
Attorney—Ernest G. Montague

[57] ABSTRACT

Coating apparatus includes a vertically arranged multi-zone drying oven. The oven is separable along vertical sections thereof for easy access. Each oven zone has an electrical heating means which is controlled by a PID circuit.

3 Claims, 3 Drawing Figures

APPARATUS FOR COATING MATERIALS OF ALL KINDS WITH A PLASTIC COATING, IN PARTICULAR FOR IMPREGNATING WEBS OF INSULATING MATERIAL WITH ELECTRICALLY CONDUCTING PLASTIC DISPERSIONS

The invention relates to an apparatus for coating materials of all kinds with a plastic coating, in particular for impregnating webs of insulating material with electrically conducting plastic dispersions, whereby for passing the materials through the apparatus, transport means as, for example, transport rollers or the like are provided. It is an object of the present invention to provide an apparatus, apart from cleaning and control means, comprising a drying oven having preferably several heating zones, whereby for heating the heating zones a multi zone control unit, comprising a continuous or quasi continuous setting member is provided. According to a further feature of the invention the multi zone control unit comprises a thyristor control or triac control.

With the above and other objects in view the present invention will become apparent in the following detailed description the present invention will be clearly understood in connection with the accompanying drawings, in which:

The enclosed drawings by way of example illustrate embodiments of the object of the invention.

Figure 1:
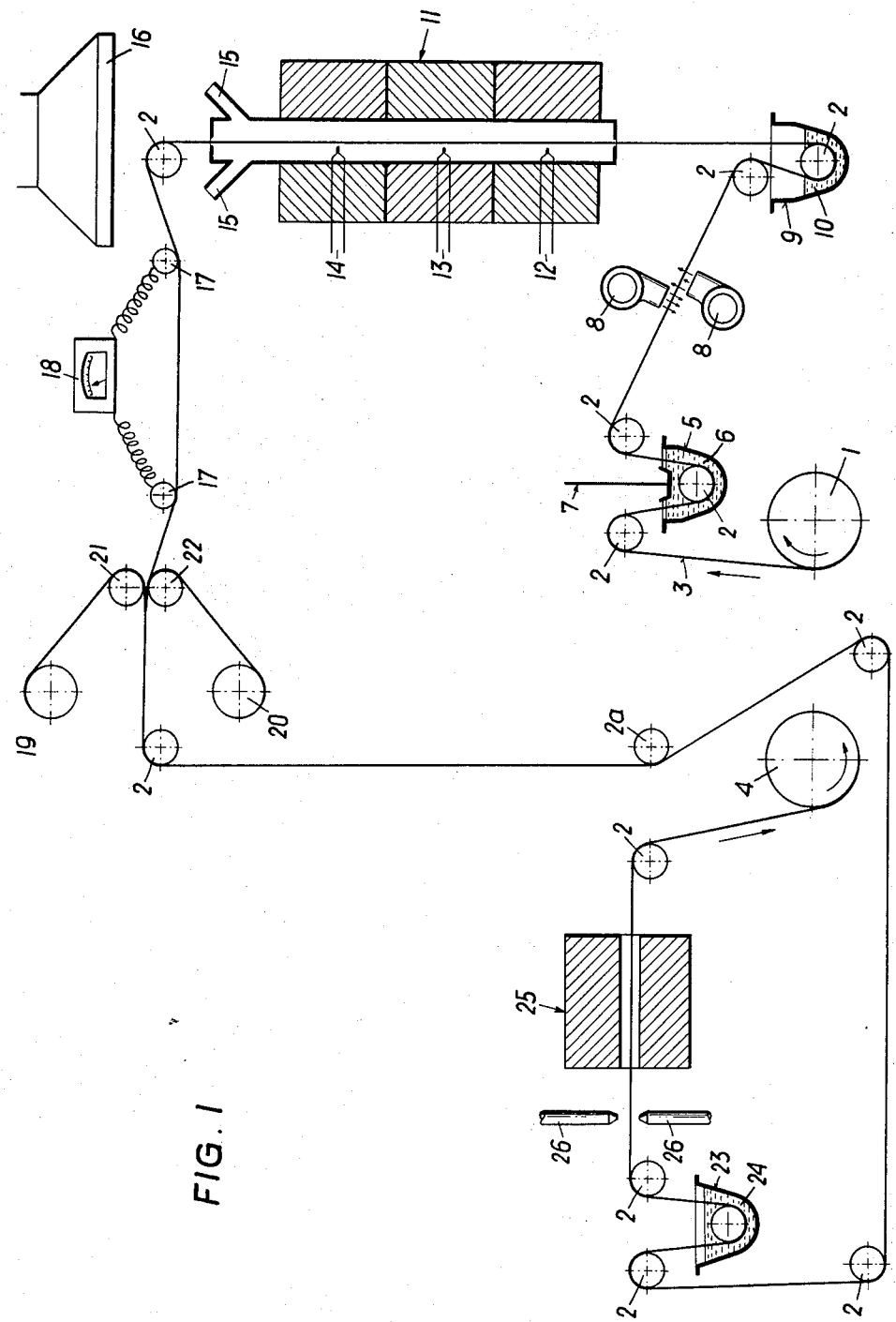
Figure 2:
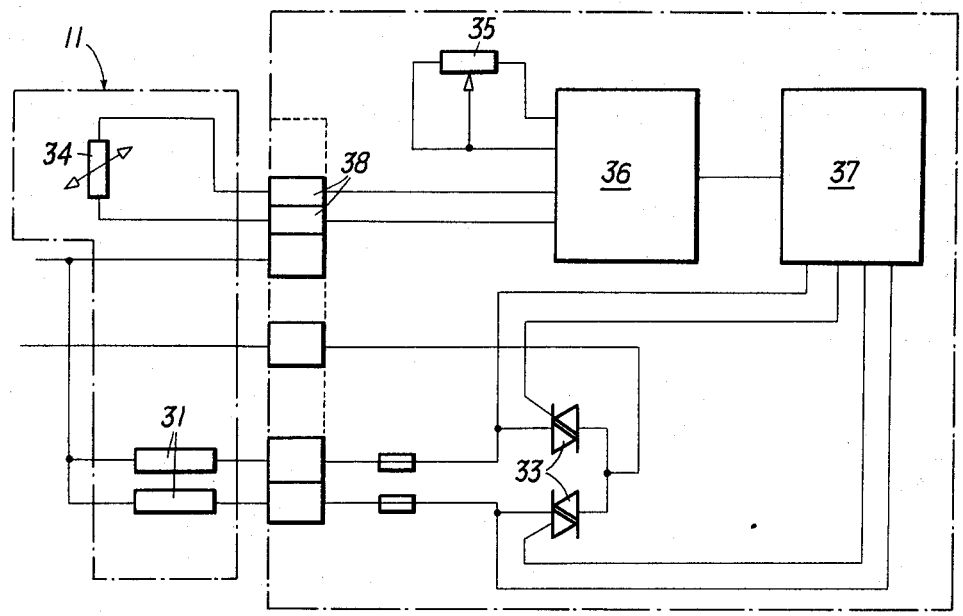
Figure 3:
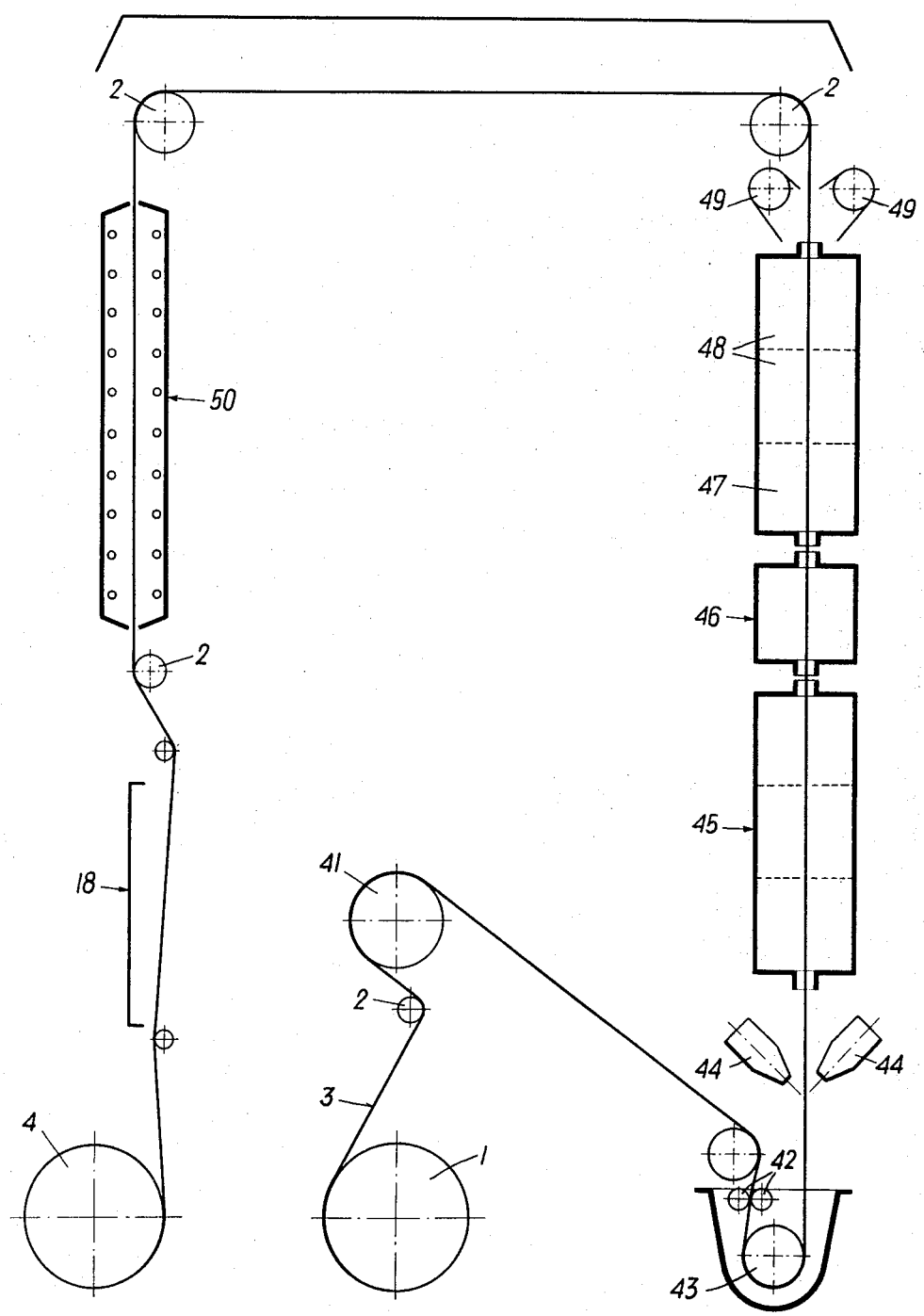

FIG. 1 is a schematic view of an apparatus;
FIG. 2 illustrates the inventive control of a zone;
FIG. 3 is a schematic view of another apparatus.

The apparatus according to FIG. 1 shows a delivery spool 1 comprising a wound-up web 3 of insulating material. Furthermore guide rollers 2 are provided, whereby the web 3 after passing diverse treatment means is guided to a wind-up roller 4. At the beginning, the web passes the cleaning bath 6 in container 5. The cleaning process can be promoted by an ultra sonic device 7 being known per se. The drying blower 8 serves for removal of the cleaning medium. Finally the tape or web enters the container 9 comprising the plastic dispersion serving for the purpose of impregnation. During the impregnation step the plastic dispersion is kept at a temperature being most suitable for the intended purpose. Then the tape enters the oven 11 which for example comprises three heating zones, the temperatures thereof being able to be individually controlled by control means 12, 13 and 14. The control of the heating of the heating zones is in particular the object of the present invention. In the first zone of the oven, the solvent of the plastic dispersion is evaporated. In the second zone the particles which were dispersed in the solvent agglomerate and in the third zone finally a sintering step is effected. In vertical direction, the oven is provided multipart, so that by removing or opening up, respectively, the two sectional parts, the heating zones can be exposed. In that way, the maintenance of the oven (cleaning and repair) is greatly simplified. Also the inserting of the tape upon starting of the apparatus can be done without difficulties. The gases formed upon evaporation of the solvent are exhausted by the exhausts 15 provided above the oven and by the exhaust hood 16. By the instrument 18 of the control means 17, a continuous control of the electric resistance of the impregnated heating foils can be achieved.

The further means to be passed by the tape are provided alternately and serve for the purpose of applying isolating layers on the tape which already has been provided with a conducting layer. The delivery spools 19 and 20 comprise a wound-up foil of insulating material which by means of rollers 21 and 22 can be applied to the conducting tape. On the other hand also by dipping into the insulating varnish 23 disposed in the container 24, an insulating layer can be applied to the tape which already has been provided with a conducting layer. For the purpose of burning in the insulating layer, the transit oven 25 is provided. A further possibility for applying the insulating layer is provided by the spraying device 26. A uniform and, above all, spraying application of the layer is achieved by electrostatic spraying. By use of an infinitely variable transmission it is possible to alternately power the rollers 1, 4 or 2a and to moreover adapt the entire drive of the train of rolls to different carrier materials.

In FIG. 2 a heating coil 31 provides for the heating of a zone of the oven 11. Two heating coils 31 are provided which are controlled by two triacs 33 as will be explained below. It is evidently possible to use a single heating coil 31 and only one triac 33, if the output is to be smaller. In the same heating zone of the oven 11, furthermore, a control resistance 34 is provided being subjected to the same temperature as obtained by the heating coils 31 of the zone. By an adjusting potentiometer (setting potentiometer) 35 the temperature to be maintained in the heating zone is adjusted. The adjusting potentiometer co-operates with a PID-control 36 (proportional, integral, differential) being known per se. On the other hand also the control resistance 34 is connected to the PID-control. In a manner being also known per se the triacs 33 are controlled by the PID-control 36 via the firing unit 37, so that the signal given by the control resistance 34 will have the same value as the signal set by potentiometer 35. If for example the temperature in the heating zone is too low, also the control resistance 34 will have a temperature too low. The adjusting potentiometer 35 is set on a higher temperature to be obtained. The two different signals (due to the temperature of the control resistance 34 being too low and the setting of the potentiometer 35 corresponding to the correct temperature) are processed by the PID-control in a way so that via the firing unit 37 the triacs 33 are controlled to supply the heating coils 31 with more electric current. The control by the triacs 33 is effected in a manner known per se so that a continuous control is achieved. (There is no control of the on- and off-type). It is possible therefore to maintain the temperature of the heating zone at any time at the desired value. The firing unit 37 being also known per se on the output thereof delivers the firing impulses necessary for the triacs 33, the firing impulses being electrically shiftable in a continuous manner in the range of 0°–180° depending on the input voltage delivered by the control unit 36. In the embodiment according to FIG. 1 three heating zones are provided, whereby each zone is to be maintained at a particular temperature and to be precisely observed. According to the present invention each one of the zones is provided with a device according to FIG. 2. The control means for the different heating zones can be substantially of the same type, whereby the desired temperature is set on the respective adjusting potentiometers 35 (pre-selected). In order to be able to suitably connect the different devices, a terminal strip 38 is provided.

In the embodiment illustrated in FIG. 3 the corresponding elements have the same reference numbers as in FIG. 1. A delivery spool 1 and a wind-up roller 4 are provided. As before, the web 3 of insulating material is passed through different treating devices and guided by guide rollers 2. In the range 18 the illustrated embodiment also allows a continuous measuring of the electrical resistance of the impregnated heating coils. Different from the embodiment illustrated in FIG. 1, the impregnated device according to FIG. 3 comprises a brake roller 41 moving the web 3 of fabric to squeezing rollers 42 and a laminated roller 43. The laminated roller is provided with circumferential laminations whereby an improved approach of the impregnating solution to the fabric webs is obtained. The blower orifices 44 serve for the purpose to blow the liquid film on the surface of the fabric web back into the container comprising the impregnating solution. Thus, the blower orifices act as a contactless strippers. The oven comprises three temperature control zones, that is a pre-drying zone 45, a pre-sintering zone 47 and a sintering zone 48. A drying device 46 using infrared rays is provided therebetween and is primarily intended for drying subsurface zones. Also for the purpose of redrying an infrared device 50 is provided.

The invention, among other things, is based upon the realization that electric heating tapes with uniform properties (above all with uniform electric resistance) can only be produced by a continuous method if the temperature of all parts of the oven can be maintained and controlled in a most precise way. The control must not be affected by different working conditions, for example, when different fabrics and dispersions are used, or when the moving speed of the goods or the output of the exhaust means for the volatile solvents are changed.

The invention is not restricted to the illustrated embodiments. As the setting (adjusting) member, a regulation transformer can be used. In that case in the circuit according to FIG. 2, the firing unit is replaced by a suitable driving mechanism. If an ignitron is used instead of the triacs, the circuit according to FIG. 2 can, apart from that, remain unchanged. Instead of a triac, two antiparallel connected thyristors can be used; as above stated the remaining elements of the circuit will be provided as shown in FIG. 2. It shall finally be stated that the apparatus according to the invention can also be used with a process wherein the applying of the coats, prior to a sinter phase, is effected in different tanks arranged in series and being provided with accompanying drying ovens. It is also necessary that drying ovens arranged individually one behind the other will be precisely maintained at a definite temperature, which can be achieved with the apparatus according to the invention.

The present invention also comprises the apparatus illustrated in FIG. 3. In this regard, a temperature control can also be effected in another known manner (that is not under use of a multi zone control unit comprising a continuous or quasi continuous adjusting or setting member or a thyristor control or a triac, respectively). While we have disclosed several embodiments of the present invention, it is to be understood that these embodiments are given by example only and not in a limiting sense.

We claim:

1. A coating apparatus for impregnating insulation webs with electrically conducting dispersions of synthetic material comprising, in a moving passing-through direction of the web, a braking roller means for said web, squeezing roller means for squeezing said web passing therebetween, dipping applying means for impregnating said web with a liquid, electrically conducting dispersion of synthetic material, blower nozzle means for removing excess liquid film from the surface of said web, a single multi-zone drying oven means wherein said zones are vertically arranged, one above the other, and said oven comprises two vertically facing sections which are separable for access thereinto, an after-drying means, transportation roller means throughout the path of said web for passing said web seriatim through each of said apparatus means, said multi-zone oven including a drying zone and a sintering zone for said web having said dispersion, a multi-zone regulator having an adjusting means for individually controlling the zones of said multi-zone oven, and said multi-zone regulator comprising for each zone, a heating coil means for heating the corresponding zone, an adjusting potentiometer connected to a PID control, a control resistance operatively connected to said PID control, a firing means connected to said PID control for providing firing impulses continuously shiftable in the range of 0°–180° dependent on the input voltage provided by said PID control, and electronic means for controlling said heating coil means and being fired by said firing means.

2. The apparatus as set forth in claim 1, wherein, said electronic means comprises a thyristor control.

3. The apparatus as set forth in claim 1, wherein, said electronic means comprises a triac control.

* * * * *